United States Patent
Mejyr

(10) Patent No.: US 7,821,751 B2
(45) Date of Patent: Oct. 26, 2010

(54) ESD-DETECTOR

(75) Inventor: Sven Mejyr, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 274 days.

(21) Appl. No.: 12/025,831

(22) Filed: Feb. 5, 2008

(65) Prior Publication Data

US 2009/0195945 A1    Aug. 6, 2009

(51) Int. Cl.
*H02H 3/22* (2006.01)

(52) U.S. Cl. .......................... 361/56; 361/111

(58) Field of Classification Search ............... 361/56, 361/111
See application file for complete search history.

(56) References Cited

U.S. PATENT DOCUMENTS

| | | | |
|---|---|---|---|
| 4,631,473 A | 12/1986 | Honda | |
| 5,717,558 A | 2/1998 | Lynn et al. | |
| 5,923,160 A | 7/1999 | Dechiaro et al. | |
| 7,142,400 B1 * | 11/2006 | Williams et al. | 361/18 |
| 2007/0174011 A1 * | 7/2007 | Enta | 702/81 |
| 2008/0291591 A1 * | 11/2008 | Huang et al. | 361/56 |
| 2009/0059440 A1 * | 3/2009 | Moe et al. | 360/323 |

OTHER PUBLICATIONS

International Search Report, corresponding to PCT/EP2008/059000, mailed Jan. 23, 2009.
Written Opinion of the International Searching Authority, corresponding to PCT/EP2008/059000, mailed Jan. 23, 2009.

* cited by examiner

*Primary Examiner*—Danny Nguyen
(74) *Attorney, Agent, or Firm*—Renner, Otto, Boisselle & Sklar, LLP

(57) ABSTRACT

The invention relates to a method for reducing the adverse effects of electrostatic discharge events occurring in a handheld device. The invention involves the steps of enabling a detector for detection of an electrostatic discharge event in the handheld device, detecting the electrostatic discharge event which has affected the handheld device, generating an event signal in response to the electrostatic discharge event, and applying the event signal to the detector, retrieving status information from circuits and components in the handheld device, analysing the event signal and the status information, and taking an action based on the analysis to mitigate any adverse effects of the detected electrostatic discharge event.

28 Claims, 7 Drawing Sheets

ESD-DETECTOR

TECHNICAL FIELD

The present invention relates in general to a method for detecting an electrostatic discharge event in an electronic device, such as a mobile communication device, and to help the electronic device to recover from any adverse effects induced by the electrostatic discharge event.

BACKGROUND ART

The effect of electrostatic charging has been recorded throughout history. For example, the ancient Greeks noted that when amber was rubbed with cat's fur it started to attract small pieces of almost any light weighted material. Since then we have learned much about this phenomenon, and today electrostatic charging is used in a wide variety of products ranging from laser printers to air cleaners. However, we have also learned that a large build-up of electrostatic charges followed by an uncontrolled discharge, also known as an electrostatic discharge (ESD) event, may severely damage an electronic device.

The generation of an ESD event is mainly due to either triboelectrification or induction charging. Triboelectrification, or tribocharging, occurs when two materials are brought into contact and then separated, causing a separation of electric charges. Typical examples of tribocharging include walking on a rug with insulated footwear, descending from a car, or rubbing a balloon in the hair. In all these cases, the friction between two materials creates a difference of electrical potential which might lead to an ESD event when the charges object comes into contact with a grounded object.

Induction charging occurs when an electrically charged object is placed in the vicinity of a conductive object which is isolated from ground. The presence of the charged object creates an electrostatic field that causes electrical charges on the surface of the other object to redistribute into regions of excess positive and negative charges. An ESD event may then occur when the object comes into contact with a conductive path. An example of this is for instance when charged regions on the surfaces of a plastic bag induce potential on a nearby electronic component, and when the component is touched with a grounded metallic tool an ESD event occurs.

As mentioned above electronic devices may be damaged by and ESD event. This is due to the fact that modern-day semiconductor devices are very sensitive to ESD, and when subjected to an ESD event the devices may suffer direct, indirect and latent damage. The direct damage results from physical destruction, or degradation, of an electronic part in the device, which makes it unusable. This failure is classified as a hard failure since it is irreversible. An indirect damage is the result of when for instance a device changes its state due to conducted or radiated electromagnetic interference (EMI) sourced by the discharge. This failure is classified as soft failure. A latent damage is when a discharge affects the device which does not show any apparent damage but with time causes a hard failure to occur. Because of the increase in use of semiconductor devices in every aspect of life, it has become an important issue to protect electronic devices as much as possible from damage or malfunction due to ESD.

The most common ways of minimizing the effects of an ESD event on an electronic device is to either add protective circuitry, apply shielding to ESD sensitive circuitry in the device, or to construct an elaborate ground system which can dissipate the high transient currents generated during an ESD event. Although these precautions may protect the device from suffering hard failures, soft failures resulting in erroneous behaviour or hang-ups of the device may still occur due to the EMI generated by discharges.

SUMMARY OF THE INVENTION

With the above description in mind, then, an aspect of some embodiments of the present invention is to provide an ESD-detector consisting of detector circuitry and a detector antenna, which seeks to mitigate, alleviate or eliminate one or more of the above-identified deficiencies in the art and disadvantages singly or in any combination.

An aspect of the present invention relates to a method for mitigating effects of electrostatic discharge events occurring in a handheld device, comprising the steps of enabling detector for detection of an electrostatic discharge event in said handheld device, detecting said electrostatic discharge event effecting said handheld device, generating an event signal in response to said detected electrostatic discharge event, retrieving status information from circuits and components in said handheld device, analysing said event signal and said status information, and taking an action in said handheld device based on said analysis.

The method may also comprise an action which comprises a restart of said handheld device.

The method may also comprise an action which comprises a restart of effected circuits and components determined by said analysis.

The method may also comprise an action comprised to not taking an action.

The method may also comprise a detecting step which uses a detector comprising a detector circuitry and a detector antenna.

The method may also comprise a detecting step which uses a detector antenna comprising at least one loop antenna.

The method may also comprising a detecting step which uses a detector antenna comprise at least one monopole antenna.

The method may also comprising a detecting step which uses a detector antenna comprise of a combination of at least one loop antenna and at least one monopole antenna.

The method may also comprise retrieval of status information which also comprises the step of storing said status information in a memory.

The method may also comprise an analysis which is also based on said stored status information.

The method may also comprise the generation of an event signal which is determined by either a pre-defined threshold value or a user-defined threshold value.

The method may also comprise an action which also comprises the step of storing information about the action in a memory.

The method may also comprise an analysis which is also based on said stored information about previous actions taken.

The method may also comprise a generation of event signal which also comprise the step of storing the occurrence of an event signal in a memory to be used for statistical purposes.

The method may also comprise a detecting step which uses a detector antenna which comprising one or more detector antenna structures, wherein a detector antenna structure may either be an etched trace on a printed circuit board, a conducting wire, or other conducting antenna element.

Another aspect of the present invention relates to an arrangement for mitigating effects of electrostatic discharge events occurring in a handheld device, the arrangement comprising means for enabling detector for detection of an electrostatic discharge event in said handheld device, means for detecting said electrostatic discharge event effecting said handheld device, means for generating an event signal in response to said detected electrostatic discharge event, means for retrieving status information from circuits and components in said handheld device, means for analysing said event signal and said status information, and means for taking an action in said handheld device based on said analysis.

The arrangement may also comprise means for restarting said handheld device.

The arrangement may also comprise means for restarting effected circuits and components determined by said analysis.

The arrangement may have a detector which is comprised of detector circuitry and a detector antenna.

The arrangement may have a detector antenna which is comprised of at least one loop antenna.

The arrangement may have a detector antenna which is comprised of at least one monopole antenna.

The arrangement may have a detector antenna which is comprised of a combination of at least one loop antenna and at least one monopole antenna.

The arrangement may have means for retrieving status information which also may comprise means for storing said status information in a memory.

The arrangement may have means for analysis which also may further comprises the means for retrieving stored status information from memory.

The arrangement may have means for generation of an event signal which may comprise means for setting a pre-defined threshold value or a user-defined threshold value.

The arrangement may have means for action which also may comprise the means for storing information about the action in a memory.

The arrangement may have means for analysis which also may further comprise the means for retrieving stored information about previous actions taken.

The arrangement may have means for generation of event signal which also may comprise the means for storing the occurrence of an event signal in a memory to be used for statistical purposes.

The arrangement may have a detector antenna comprised of one or more detector antenna structures, wherein the detector antenna structure may either be a etched trace on a printed circuit board, a conducting wire, or other conducting antenna element.

The features of the above-mentioned embodiments can be combined in any combinations.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Embodiments of the present invention relate, in general, to the field of detection of electrostatic discharge events, in electronic devices, and the mitigating of any adverse effects thereof. A preferred embodiment relates to a portable communication device, such as a mobile phone, including one or more input devices. However, it should be appreciated that the invention is as such equally applicable to electronic devices which do not include any radio communication capabilities. However, for the sake of clarity and simplicity, most embodiments outlined in this specification are related to mobile phones.

Embodiments of the present invention will hereinafter be described in more detail with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

As discussed in the background art, an ESD event may induce a soft failure in an electronic device such as a mobile phone. Soft failures often result in temporary malfunction of the device, such as a hang-up or a freeze, which disappears after a restart (power off-power on) of the device. However, in many cases a complete restart of the device is unnecessary since the soft failure often only affects a specific electronic part in the device, which in many cases can be restarted separately without restarting the entire device. The present invention describes an ESD-detector that is capable of detecting an ESD event and determine if the device needs to be completely restarted or if only one or more electronic parts in the device needs to be restarted. In this way user avoid the often unnecessary and cumbersome process of restarting the entire device.

Figure 1:
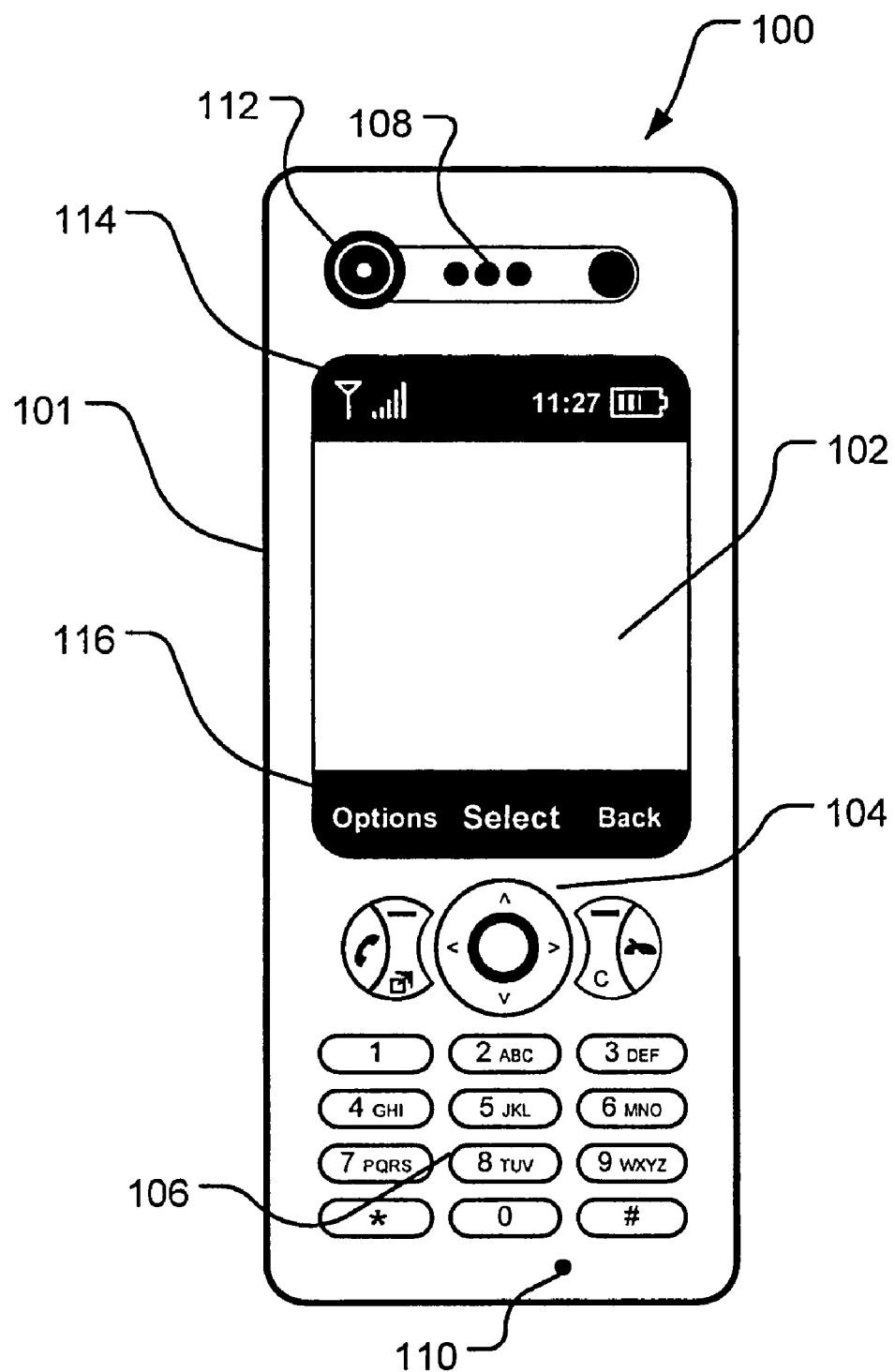
FIG. 1 shows a mobile communication device, in this case a mobile phone, according to an embodiment of the present invention.

FIG. 1 shows a typical mobile communication device 100 comprising a casing 101, a display area 102, and means 104 for navigating among items (not shown) displayed in the display area. The display area 102 may comprise a status indication area 114 and one or more softkey bars 116. The status indication area 114 may for example include symbols for indicating battery status, reception quality, speaker on/off, present mode, time, date, etc. The status indication section is not in any way limited to include the symbols and the functions presented herein. The softkey bar 116 is operable using the navigation means 104 or, if using a touch sensitive screen, by tapping the softkey directly with a pen-like object, a finger, or other body part. The functions of the softkeys are not limited by the functions indicated in the figure. Neither are the placements of the softkey bar 116 and the status indication area 114 limited to be placed at the bottom and the top of the screen, as shown in the example. The navigation means 104 can be a set of buttons, a rotating input, a joystick, a touch pad, a multidirectional button, but can also be implemented using a touch sensitive display, wherein the displayed items directly can be tapped by a user for selection, or be voice activated via a headset or a built-in microphone. The mobile communication apparatus 100 can also comprise other elements normally present in such a device, such as a keypad 106, a speaker 108, a microphone 110, a camera 112, a processor (not shown), a memory (not shown), an accelerometer (not shown), a vibration device (not shown), etc.

Figure 2:
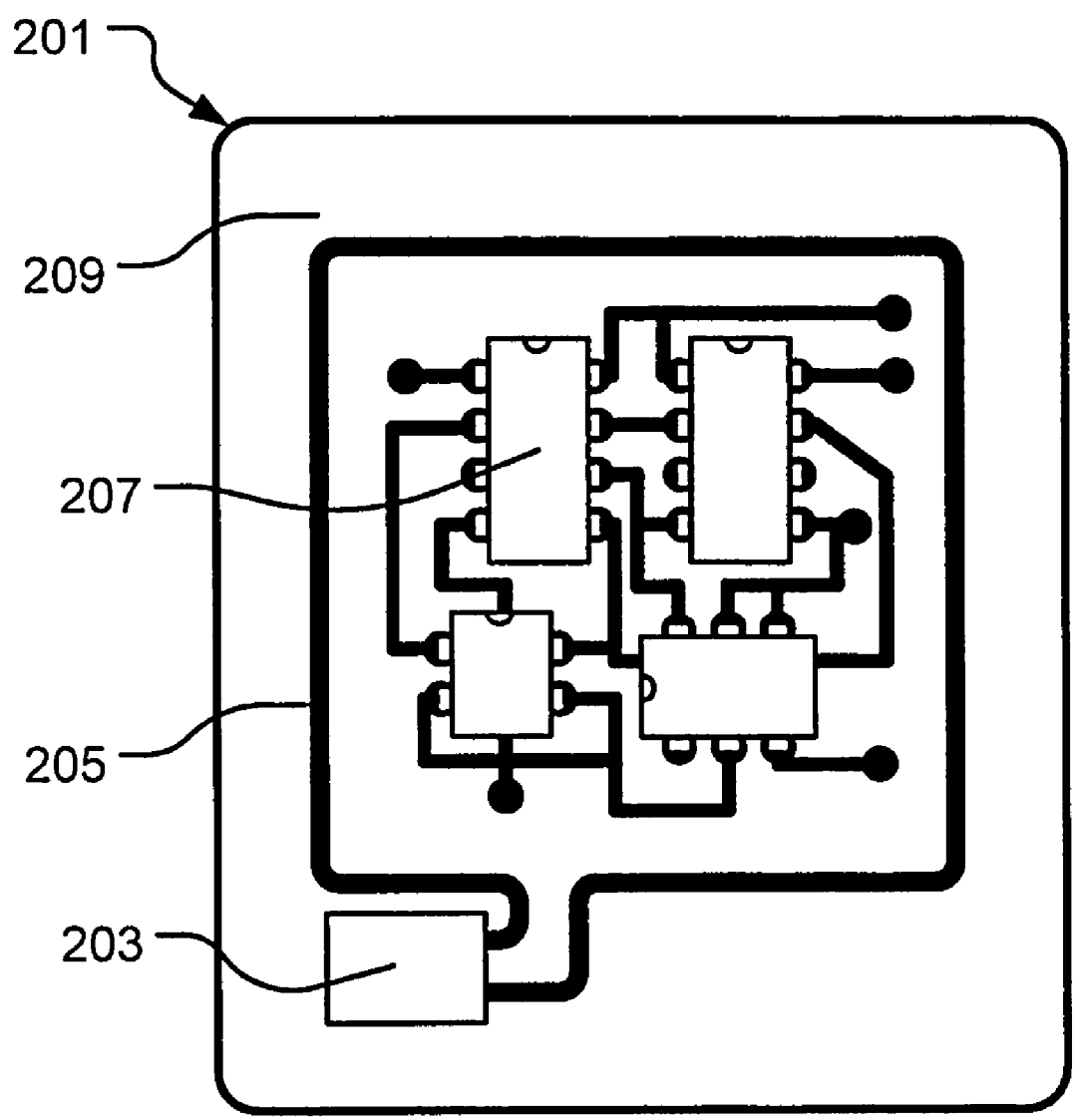
FIG. 2 shows a printed circuit board with an ESD-detector consisting of detection circuitry and a detector antenna in the form of a loop antenna, according to an embodiment of the present invention.

FIG. 2 shows an example of an implementation of an ESD-detector 201 according to an embodiment of the present invention. The ESD-detector consists of detector circuitry 203 and a detector antenna structure 205. The detector antenna 205, made of a conducting material, detects the radiated energy which is present in an electric field when an ESD event occurs. The energy detected by the detector antenna 205 is interpreted as an ESD event signal by the detector circuitry 203. The detector antenna may be implemented in several different ways. In the example in FIG. 2, the detector antenna 205 is implemented as a conducting path (an etched trace), along the outer boarder of the printed circuit board (PCB) 209, forming a loop (a.k.a. a loop antenna). The detector circuitry 203 may consist of one or more application specific integrated circuits (ASICs) designed to, together with a detector antenna, perform the functions of the ESD-detector. The detector circuitry 203 may also consist of a collection of electronic components, such as processors, ASICs, filters, logic blocks, resistors, transistors, etc., which together with a detector antenna perform the functions of the ESD-detector. The functionality performed by the ESD-detector may either be fully implemented in hardware or implemented using both hardware and software.

Figure 3:
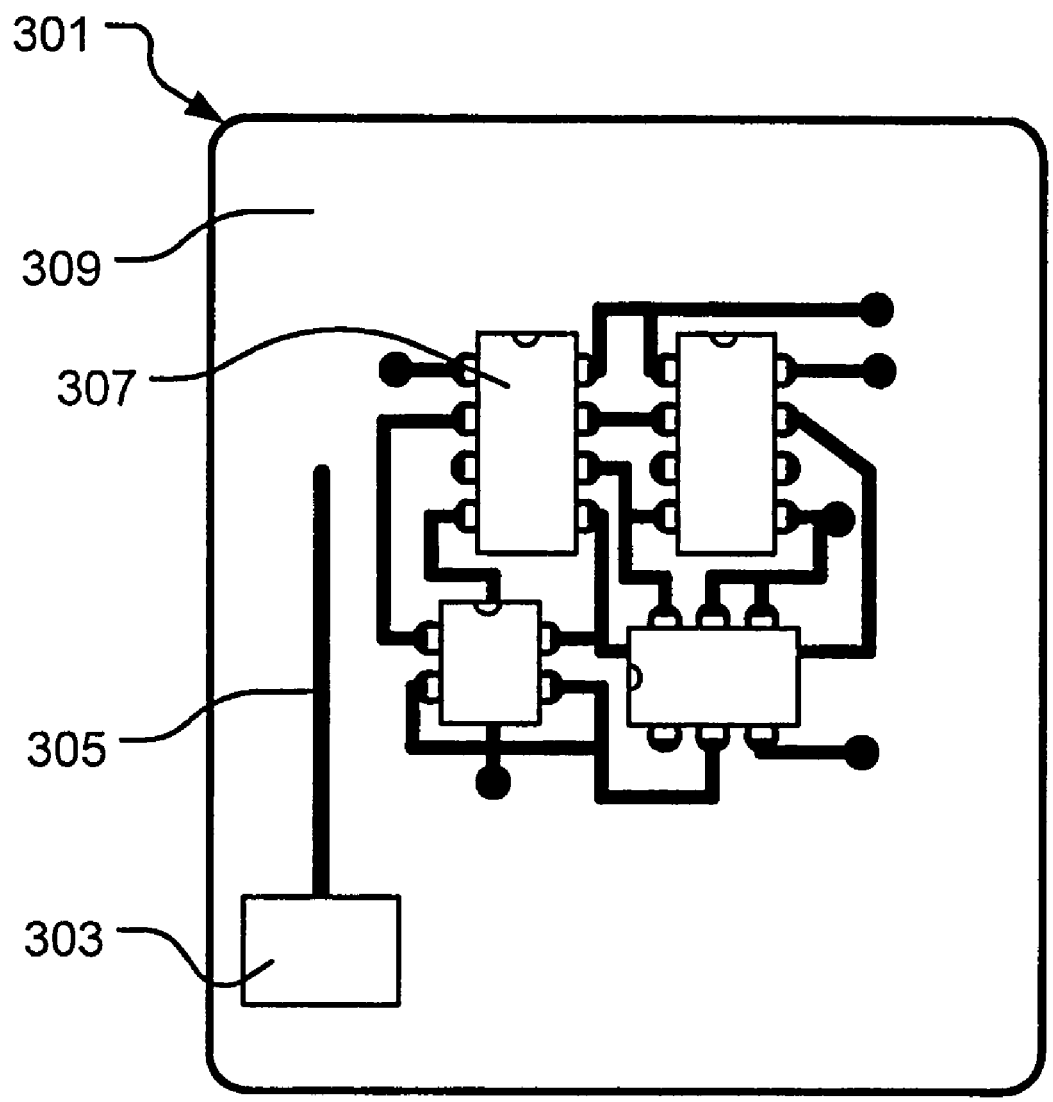
FIG. 3 shows a printed circuit board with an ESD-detector consisting of detection circuitry and a detector antenna in the form of a monopole antenna, according to an embodiment of the present invention.

FIG. 3 shows another embodiment of an ESD-detector according to the present invention. In some cases, due to routing limiting factors and/or limited space on the PCB, it is impossible to implement a loop antenna as shown in FIG. 2. An alternative detector antenna structure is an element with one beginning and one end (a.k.a. monopole antenna) 305. This type of antenna consumes less precious PCB space 309 than a loop antenna. FIG. 3 shows how the monopole antenna 305, etched on the PCB 309 alongside a group of circuits 307, is connected to the detector circuitry 303. When an ESD event occur the monopole antenna 305 detects the event and generates a signal which is interpreted by the detector circuitry 303.

Figure 4:
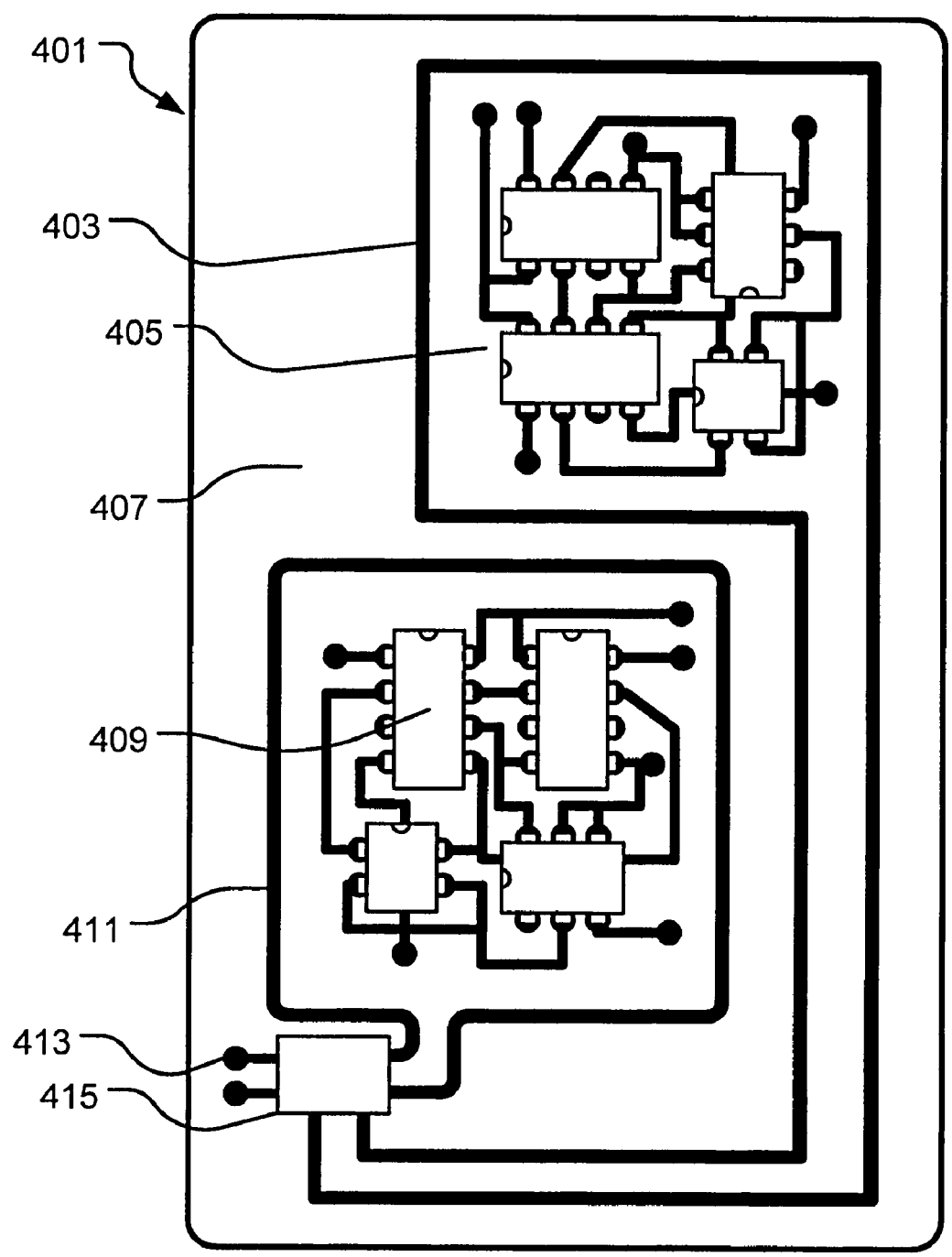
FIG. 4 shows a printed circuit board with an ESD-detector consisting of detection circuitry and several detector antennas, according to an embodiment of the present invention.

FIG. 4 shows yet another embodiment of an ESD-detector according to the present invention. In FIG. 4, two loop antennas 405, 411, connected to the detector circuitry 415, encircle two groups of electronic circuits 405, 409 mounted on the PCB. In this way when an ESD event occurs the detector circuitry is able detect if both groups of electronic circuits are affected by the ESD event, or not. The electronic circuits in one of the groups may be unaffected by the ESD event, whilst the electronic circuits in the other group may be affected and may need to be restarted. If this should be the case, only the electronic circuits belonging to the group that has been affected by the ESD event is restarted.

If other devices are added to the main device, such as an add-on camera unit added to a mobile phone, it is possible that only the external unit may be affected by an ESD event. To be able to detect problems due to ESD events in external units, it is possible to integrate antennas (monopole or loop antennas) in the external unit as well. The detector antenna in the external unit may then be connected to the detector circuitry 415 via the external antenna connectors 413 as shown in FIG. 4. In this way only one ESD detector is needed, thus reducing the implementation cost.

The antenna structures presented in the embodiments above may be implemented in virtually any shape, size or combination (loop—monopole, several loops, several monopoles structures), as long as they present loop- and monopole antenna characteristics, and consequently are useful to determine the occurrence of an ESD event. The antenna structure may also be implemented using wires or any other antenna element, instead of or in combination with etched leads on a PCB.

Several embodiments describing the functionality of the ESD-detector will now be discussed using flowcharts.

Figure 5:
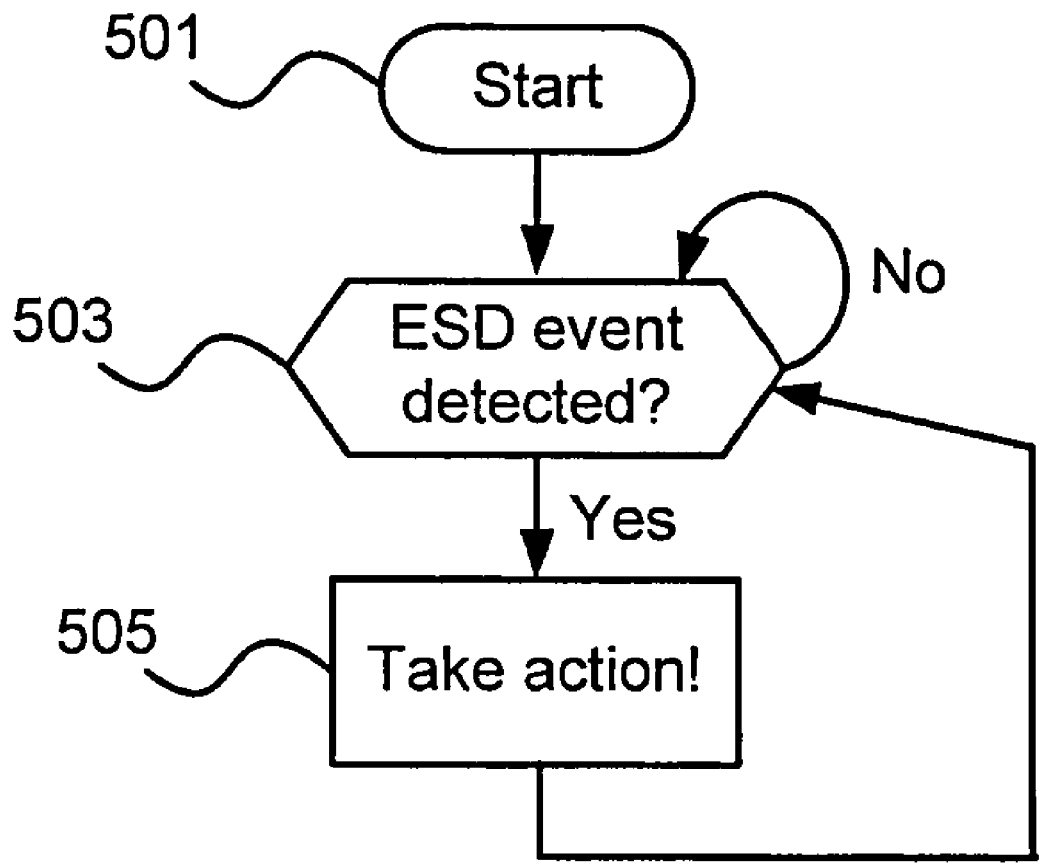
FIG. 5 shows a flowchart describing the operations of an ESD-detector, according to an embodiment of the present invention.

FIG. 5 shows a flowchart describing the functionality of an ESD-detector according an embodiment of the present invention. When the device is activated the ESD-detector also becomes active 501. The ESD-detector immediately enters into a wait-state 503, waiting for an ESD event to be detected by the detector antenna. When an ESD even occur it induces a signal into the detector antenna. The detector circuitry may determine if the generated antenna signal is the result of a genuine ESD event or just some random noise. The evaluation of the received signal(s) can be done in several ways. In one embodiment all generated signal(s) larger than a pre-defined, or user-defined, threshold value is to be treated as a signal generated from an ESD event. In another embodiment the signal(s) coming from the antenna may undergo signal processing to determine if it belongs to a harmful ESD event or not. When an ESD event has been detected, an action is taken 505, which in this case may be to restart predetermined components known to be susceptible to ESD events, or to reset specific circuits or the entire device. When an action has been applied by the ESD-detector, to the electronic part(s) and/or circuit(s) in the device, the ESD-detector returns to its wait-state 503, waiting for a new ESD event to be detected.

The detection of an ESD event may be indicated to a user by displaying a message, indicating via a special ESD icon, playing an audio signal, vibrating the device, or a combination thereof.

Figure 6:
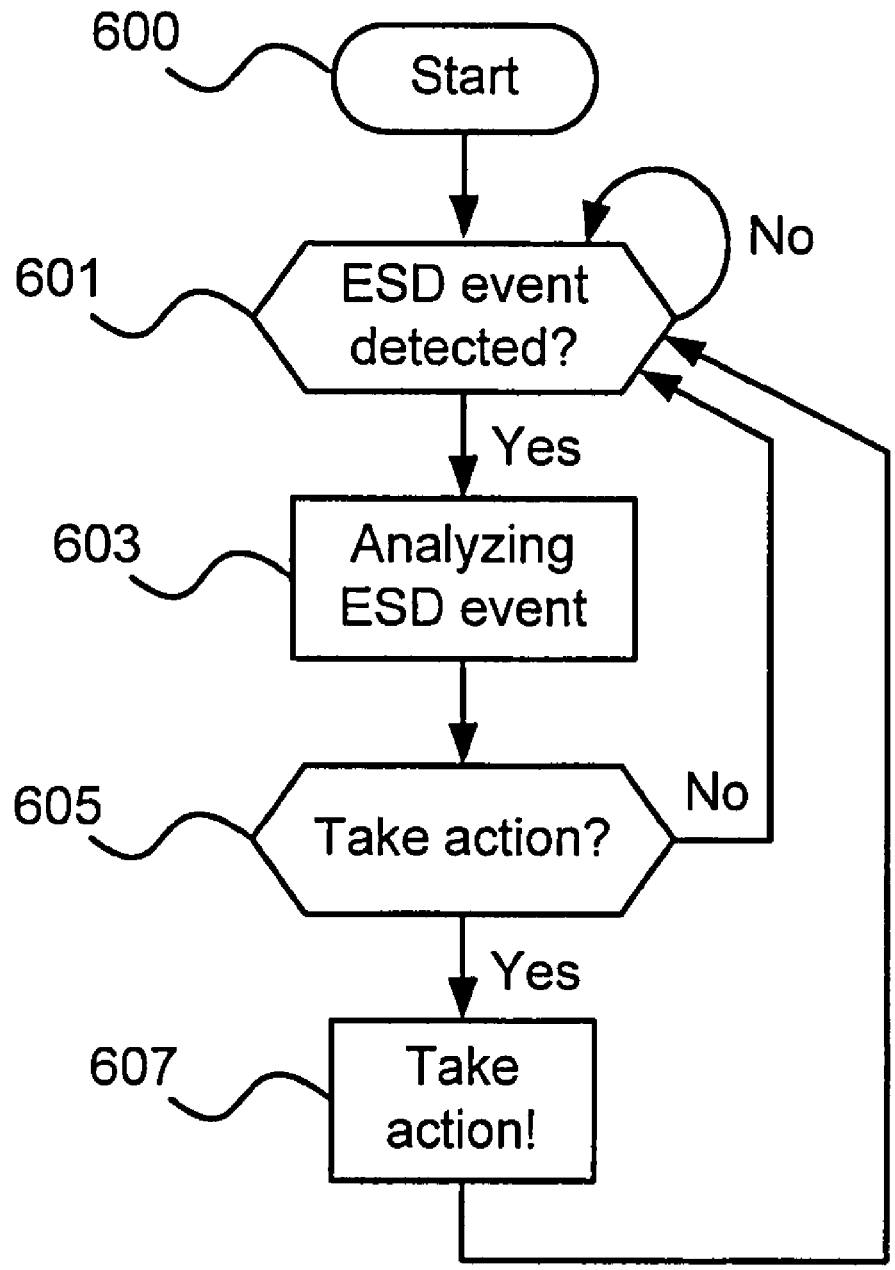
FIG. 6 shows another flowchart describing the operations of an ESD-detector, according to an embodiment of the present invention.

FIG. 6 shows a flowchart describing the operations of an ESD-detector according another embodiment of the present invention. When the device is activated the ESD-detector also becomes active 600. The ESD-detector is put into a wait-state 601 where it waits for an ESD event to be detected. If an ESD event is detected an analysis stage 603 is entered. In this stage the detector circuitry collects information from the device, either by communicating directly with the electronic circuits and components or by communicating with the processor(s) in the device, to determine the effect of the ESD event. On the basis of the collected information, together with the ESD event information from the detector antenna, the detector circuitry may conclude that the detected event is not an ESD-event (false alarm), or that it did not affect the circuitry in any way. In this case no action is taken 605, and the ESD-detector returns to its wait-state 601. However, if the analysis in 603 determines that the ESD event has affected the device, then a decision to take an action is made 605. Which kind of action to take in 607 is based on the collected information in the previous stage 603. If, for example the display in the device is detected to have been affected by an ESD event, the ESD-detector sends a signal to a control unit (processor or other component), or to the component itself, which restarts the component without restarting other unaffected components in the device. The restart can either be a soft restart, just resetting the screen, or it could be a hard restart requiring the power to the display to be powered off and then to be powered back on again. If a collection of components have failed, the ESD-detector may have to restart all or a group of components to get the device to work again. Certain components may not be able to be restarted during ongoing operation of the device. In this case the complete device has to be restarted. The actions that can be taken are not in any way limited to the actions discussed above.

Figure 7:
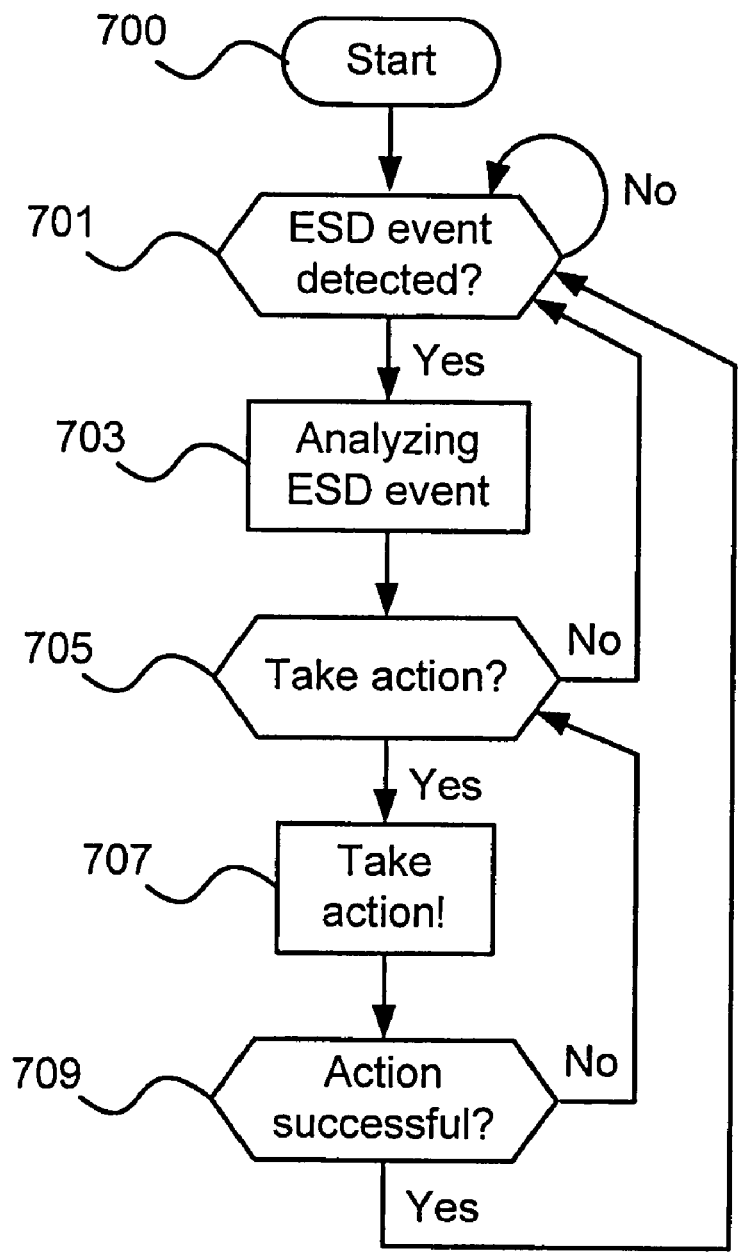
FIG. 7 shows another flowchart describing the operations of an ESD-detector, according to an embodiment of the present invention.

FIG. 7 shows a flowchart describing the operations of an ESD-detector according another embodiment of the present invention. The difference between the embodiment presented in FIG. 6 and the embodiment presented in FIG. 7 is that an additional stage 709 has been added. The purpose of the added stage 709 is to evaluate if the actions taken in stage 707 was successful or not. If the action in the previous stage 707 is determined to have been successful, the ESD-detector is put into the wait-state 701 waiting for the next ESD-event to occur. However, if the action taken in 707 was not successful the ESD-detector returns to stage 705 where it is decided if the same, another or no further action is going to be taken. In this way the ESD-detector can try several different actions to see if it can resolve the problem. If all possible actions have been tried, a power off-power on of the device can be tried as a last resort to resolve any lasting problem. The possible actions that can be undertaken are the same as the actions discussed in conjunction with the flowchart in FIG. 6.

The device/component restart operation, discussed in the embodiments above, may either be implemented in software or in hardware, or a combination of both. The hardware and/or the software implementation can either be contained in the ESD-detector circuitry and/or in other components in the device, such as in dedicated circuitry and/or in the devices processor and memory. The circuitry that performs the restart operations may determine which component(s) that need to be restarted, in what sequence they may need to be restarted, and how long any reset signals have to last. If the restart operation is implemented in standalone hardware, it can be made to operate completely autonomous from the rest of the device, which may be beneficial in comparison to a software implementation which could stop operating when key components in the device are affected. During the restart operation a message may be displayed to the user, informing the user that a restart operation is in progress.

In another embodiment the ESD-detector may be implemented in a passive state where the user is able to turn the ESD-detector on or off by choice. In this way the user can decide when to use the detector and when to turn it off, to for instance save power.

In yet another embodiment the ESD-detector may include a memory which record statistics regarding the number and the severity of the ESD events which the device is subjected to. The statistics may be used in several different ways such as a basis for determining latent ESD problems with a specific device model, as a basis for when an ESD-detector in a passive mode should be switched on/off, or as statistical data which together with stored information about previous actions taken may be a basis for the decision making when a new action is going to be taken.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for mitigating effects of electrostatic discharge events occurring in a handheld device, comprising the steps of:
   enabling detector for detection of an electrostatic discharge event in said handheld device;
   detecting said electrostatic discharge event effecting said handheld device;
   generating an event signal in response to said detected electrostatic discharge event;
   retrieving status information from circuits and components in said handheld device;
   analysing said event signal and said status information; and
   taking an action in said handheld device based on said analysis;
   wherein said action also comprises the step of storing information about the action in a memory; and
   wherein said analysis is also based on said stored information about previous actions taken.

2. The method according to claim 1, wherein said action comprises a restart of said handheld device.

3. The method according to claim 1, wherein said action comprises a restart of effected circuits and components determined by said analysis.

4. The method according to claim 1, wherein said action comprises not taking an action.

5. The method according to claim 1, wherein said detecting step uses a detector comprising a detector circuitry and a detector antenna.

6. The method according to claim 5, wherein said detecting step uses a detector antenna comprising at least one loop antenna.

7. The method according to claim 5, wherein said detecting step uses a detector antenna comprising at least one monopole antenna.

8. The method according to claim 5, wherein said detecting step uses a detector antenna comprising a combination of at least one loop antenna and at least one monopole antenna.

9. The method according to claim 1, wherein said retrieval of status information also comprises the step of storing said status information in a memory.

10. The method according to claim 9, wherein said analysis is also based on said stored status information.

11. The method according to claim 1, wherein said generation of an event signal is determined by either a pre-defined threshold value or a user-defined threshold value.

12. The method according to claim 1, wherein said generation of event signal also comprise the step of storing the occurrence of an event signal in a memory to be used for statistical purposes.

13. The method according to claim 5, wherein said detecting step uses a detector antenna comprising one or more detector antenna structures, wherein a detector antenna structure may either be a etched trace on a printed circuit board, a conducting wire, or other conducting antenna element.

14. A portable communication device comprising an arrangement for mitigating effects of electrostatic discharge events occurring in a handheld device, the arrangement comprising:
  means for enabling detector for detection of an electrostatic discharge event in said handheld device;
  means for detecting said electrostatic discharge event effecting said handheld device;
  means for generating an event signal in response to said detected electrostatic discharge event;
  means for retrieving status information from circuits and components in said handheld device;
  means for analysing said event signal and said status information; and
  means for taking an action in said handheld device based on said analysis;
  wherein said means for action also comprise the means for storing information about the action in a memory; and
  wherein said means for analysis comprise means for retrieving stored information about previous actions taken.

15. The arrangement according to claim 14, comprises means for restarting said handheld device.

16. The arrangement according to claim 14, comprises means for restarting effected circuits and components determined by said analysis.

17. The arrangement according to claim 14, wherein said detector comprise a detector circuitry and a detector antenna.

18. The arrangement according to claim 17, wherein said detector antenna comprise at least one loop antenna.

19. The arrangement according to claim 17, wherein said detector antenna comprise at least one monopole antenna.

20. The arrangement according to claim 17, wherein said detector antenna comprise a combination of at least one loop antenna and at least one monopole antenna.

21. The arrangement according to claim 14, wherein said means for retrieving of status information also comprises the means for storing said status information in a memory.

22. The arrangement according to claim 21, wherein said means for analysis further comprises the means for retrieving stored status information from the memory.

23. The arrangement according to claim 14, wherein said means for generation of an event signal comprise means for setting a pre-defined threshold value or a user-defined threshold value.

24. The arrangement according to claim 14, wherein said means for action also comprise the means for storing information about the action in a memory.

25. The arrangement according to claim 24, wherein said means for analysis comprise means for retrieving stored information about previous actions taken.

26. The arrangement according to claim 14, wherein said means for generation of event signal comprise the means for storing the occurrence of an event signal in a memory to be used for statistical purposes.

27. The arrangement according to claim 17, wherein said detector antenna comprise one or more detector antenna structures, wherein the detector antenna structure may either be a etched trace on a printed circuit board, a conducting wire, or other conducting antenna element.

28. A portable communication device comprising an arrangement for mitigating effects of electrostatic discharge events occurring in a handheld device, the arrangement comprising:
  means for enabling detector for detection of an electrostatic discharge event in said handheld device;
  means for detecting said electrostatic discharge event effecting said handheld device;
  means for generating an event signal in response to said detected electrostatic discharge event;
  means for retrieving status information from circuits and components in said handheld device;
  means for analysing said event signal and said status information; and
  means for taking an action in said handheld device based on said analysis;
  wherein said detector comprise a detector circuitry and a detector antenna; and
  wherein said detector antenna comprise a combination of at least one loop antenna and at least one monopole antenna.

* * * * *